(12) United States Patent
Sumner

(10) Patent No.: US 6,891,106 B2
(45) Date of Patent: May 10, 2005

(54) ELECTRICAL CONDUCTOR INTERCONNECTION APPARATUS

(75) Inventor: Larry Sumner, Calgary (CA)

(73) Assignee: Enmax Corporation, Calgary (CA)

( * ) Notice: Subject to any disclaimer, the term of this patent is extended or adjusted under 35 U.S.C. 154(b) by 27 days.

(21) Appl. No.: 10/798,258

(22) Filed: Mar. 12, 2004

(65) Prior Publication Data

US 2004/0182593 A1 Sep. 23, 2004

(30) Foreign Application Priority Data

Mar. 21, 2003 (CA) .............................................. 2423083

(51) Int. Cl.[7] .............................................. H02G 15/02
(52) U.S. Cl. ...................................... 174/78; 174/88 R
(58) Field of Search ............................ 174/84 C, 88 R, 174/78; 439/98, 8, 372

(56) References Cited

U.S. PATENT DOCUMENTS

| | | | | |
|---|---|---|---|---|
| 3,224,801 A | * | 12/1965 | Price-Stephens et al. | ... 403/122 |
| 3,787,795 A | * | 1/1974 | Thompson et al. | ........... 439/99 |
| 3,973,821 A | * | 8/1976 | Scott et al. | .................. 439/789 |
| 4,118,131 A | * | 10/1978 | Schnitzius | .................... 403/24 |
| 4,268,018 A | * | 5/1981 | Langanke | ................... 267/120 |
| 4,311,405 A | * | 1/1982 | Hawley | ....................... 403/142 |
| 4,388,012 A | * | 6/1983 | Erickson | .................... 403/142 |

* cited by examiner

Primary Examiner—Chau N. Nguyen
(74) Attorney, Agent, or Firm—Blake, Cassels & Graydon, LLP; Terry L. Leier

(57) ABSTRACT

Discloses a clamp and conductor interconnection apparatus suitable for use in a number of electrical transmission and distribution applications. An interconnection member is disposed on a cable clamp. The interconnection member provides a paired connector mount to mount corresponding lockable articulated cable contact connectors for coupling to conductors that are to be electrically and mechanically interconnected. Each connector mount provides a mechanism to articulate or rotate the cable contact connector with respect to the interconnection member. When the desired orientation of the cable contact connector is achieved, a releasable connector lock means is engaged to releasably fix the orientation of the cable contact connector with respect to the cable clamp.

13 Claims, 6 Drawing Sheets

ELECTRICAL CONDUCTOR INTERCONNECTION APPARATUS

FIELD OF THE INVENTION

This invention relates to apparatus for interconnection of conductors in electrical transmission and distribution facilities and more specifically to conductor interconnection apparatus suited for interconnection of earth grounds to facility conductors, interconnection of overhead cables and cable clamps and cable clips.

BACKGROUND TO THE INVENTION

Electric transmission and distribution facilities frequently require interconnection devices to permit transmission or distribution facility maintenance, for example, the clamping of an earth ground chain cable to a transmission or distribution cable conductor to permit maintenance to be performed on the transmission or distribution facilities. To perform maintenance on transmission or distribution facilities, a ground conductor is typically clamped to one or more of the transmission or distribution conductors to prevent electrical hazard to persons or equipment engaged in performing the maintenance work. Other requirements for clamping or conductor interconnection arise when a transmission or distribution conductor is to be intercoupled with another transmission conductor or to a distribution facility such as a transformer and the like. The clamping or interconnection of transmission conductors to place them in service requires apparatus suitable for use in high voltage and high current applications consonant with electrical distribution facilities.

In the past, the clamping and interconnection apparatus for these purposes required a plurality of specialized clamp and interconnection apparatus depending on the application or configuration requirements. For example, providing a ground clamp to an overhead conductor to facilitate maintenance and repairs to transmission facilities generally requires utilization of a particular type of clamp adapted for use in that configuration. Similarly, interconnection of conductors to place them in service in a transmission facility such as a transformer sub-station requires other clamp and interconnection apparatus suited for use in that configuration. Because there are a large number of clamp and interconnection apparatus that have been developed over the years to facilitate to interconnection of transmission lines that depend on the facility sought to be interconnected, a transmission or distribution provider is required to maintain a large inventory of parts suitable for use in the particular configuration or application area that may arise. It is therefore desirable to provide apparatus that is suitable for use in a number of configurations or application areas to facilitate reduction in parts inventory and generate cost savings.

SUMMARY OF THE INVENTION

The present invention provides a clamp and interconnection arrangement suitable for use in a number of electrical transmission and distribution applications. In one of its aspects, the invention provides an interconnection member disposed on a cable clamp. The interconnection member provides a paired connector mount to mount corresponding lockable articulated cable contact connectors. Each connector mount provides a mechanism to articulate or orient the cable contact connector with respect to the interconnection member. A releasable connector lock means is engaged to releasably fix the orientation of the cable contact connector with respect to the interconnection member.

Preferred embodiments of the invention will now be described with reference to the accompanying drawings in which like features of the invention bear like reference numerals throughout the various Figures.

BRIEF DESCRIPTION OF THE DRAWINGS

FIG. 3a is a perspective view of a preferred embodiment of a locking articulated cable connector portion of the invention.

FIG. 3b is a cross-section view of the cable contact connector of FIG. 3a.

DETAILED DESCRIPTION OF THE PREFERRED EMBODIMENTS

Figure 1:
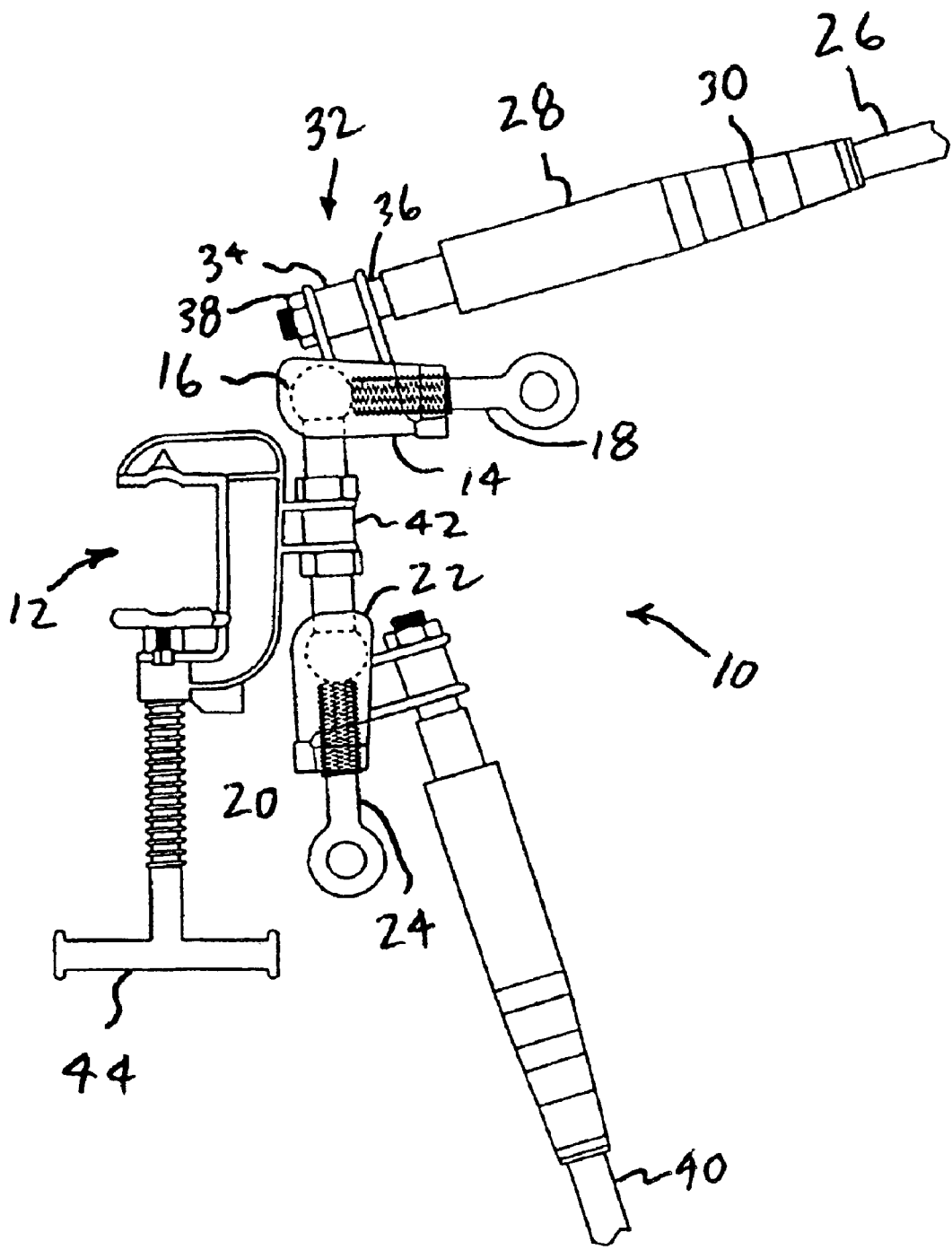
FIG. 1 is an elevation view of a preferred embodiment of the conductor interconnection apparatus of the invention, which is shown disposed on a vice clamp type cable clamp.

FIG. 1 shows an elevation view of a preferred embodiment of the invention disposed on a vice clamp type of cable clamp, generally depicted by reference number 12. The embodiment of the invention shown here provides a conductor cable interconnection assembly generally depicted by reference numeral 10. The conductor cable interconnection assembly is coupled to the cable clamp 12 by a lug 42. The interconnection member of the cable interconnection assembly is more fully described with reference to FIGS. 4a, 4b and 4c. As shown in FIG. 1, the conductor cable interconnection assembly couples to at least one locking articulated cable contact connector, for example, a first ball mount assembly 16 of the cable interconnection assembly is adapted to receive a corresponding locking articulated cable contact connector 14. Preferably, the interconnection member of the conductor cable interconnection assembly is configured to couple to more than one locking articulated cable contact connector. In the preferred embodiment depicted in FIGS. 1 and 2, the interconnection member of the cable interconnection assembly is configured with two ball stud mount assemblies 16 and 20. Providing two ball stud mount assemblies allows one or two locking articulated cable contact connectors 14 and 22 to be mounted on the interconnection member providing a cable interconnection assembly capable of interconnecting up to two conductors with the cable clamp 12. When two locking articulated cable contact connectors are used, the pair of locking articulated cable contact connectors 14 and 22 allows the electrical conductor interconnection apparatus of the present invention to be daisy chained. This daisy chain arrangement is useful, for example, to extend a ground chain conductor to each of the three conductors of a three-phase transmission facility.

Each locking articulated cable connector 14, 22 is provided with a releasable connector mount lock 18 or 24 respectively. The releasable connector mount lock 18 or 24 is configurable between a locked configuration and an unlocked configuration. When the releasable connector mount lock is configured in the locked configuration, the lockable articulated cable contact connector is maintained in a locked position relative to the interconnection member and, consequently the clamp 12. When the releasable connector mount lock is configured in the unlocked or released configuration, the lockable articulated cable contact connector is permitted to undergo relative rotation in three dimensions with respect to the clamp 12. Details of the construction of the releasable connector mount lock and lockable articulated contact connector are provided more fully in the disclosure relating to FIGS. 3a and 3b.

As described, the locking articulated cable connector 14 is angularly displaceable about ball mount assembly 16 in three dimensions. When the locking articulated cable contact connector 14 is oriented in the desired orientation with respect to the wire clamp 12, a connector mount lock 18 is engaged to lock the locking articulated cable contact connector 14 in fixed relation to the ball mount assembly 16. The interconnection member of the conductor cable interconnection assembly provides a second ball mount assembly 20, preferably disposed in generally opposing orientation to the first ball mount assembly 16. A corresponding second locking articulated cable contact connector 22 is mountable thereon and is lockable in a desired orientation by connector mount lock 24.

The second locking articulated cable contact connector 22 is free to rotate in three dimensions with respect to the corresponding ball mount assembly 20 to permit orienting the second locking articulated cable contact connector 22 in a desired relative orientation. When the second locking articulated cable contact connector 22 is positioned as desired, connector mount lock 24 is operated to lock the locking articulated mount fixedly to the ball mount assembly 20.

A conduit or conductor 26 has a ferrul 28 crimped at 30 to couple the ferrul 28 to the conductor 26. Conductor 26 can be a transmission line or a ground conductor as dictated by the needs of the application to which the assembly will be put. The end of ferrul 28 has a connector assembly generally depicted by 32 that interconnects with the locking articulated mount. To facilitate interconnection, the locking articulated mount has a lug 34 to receive a stud 36 extending from ferrul 28. The opposed end of stud 36 has a threaded circumference to engage nut 38. In this manner, conductor 26 is mechanically and electrically interconnected with wire clamp 12. As will be understood, all of the materials coupled to conductor 26 are electrically conductive and dimensioned to carry the currents found in the facilities that they will be used in. While a detailed explanation has been made only in relation to the interconnection of conductor 26 to the wire clamp 12, as shown in FIG. 1, a duplicate arrangement is used to interconnect conductor 40 to wire clamp 12. Each of the ball mount assemblies 16 and 20 of the conductor cable interconnection assembly are coupled to clamp lug 42 to complete the electrical interconnection therebetween. A vice clamp type wire clamp 12 is provided with an actuator handle 44 which is rotated to engage or disengage the wire clamp 12 to the conduit to which it will be attached (not shown).

Figures 2, 2A:
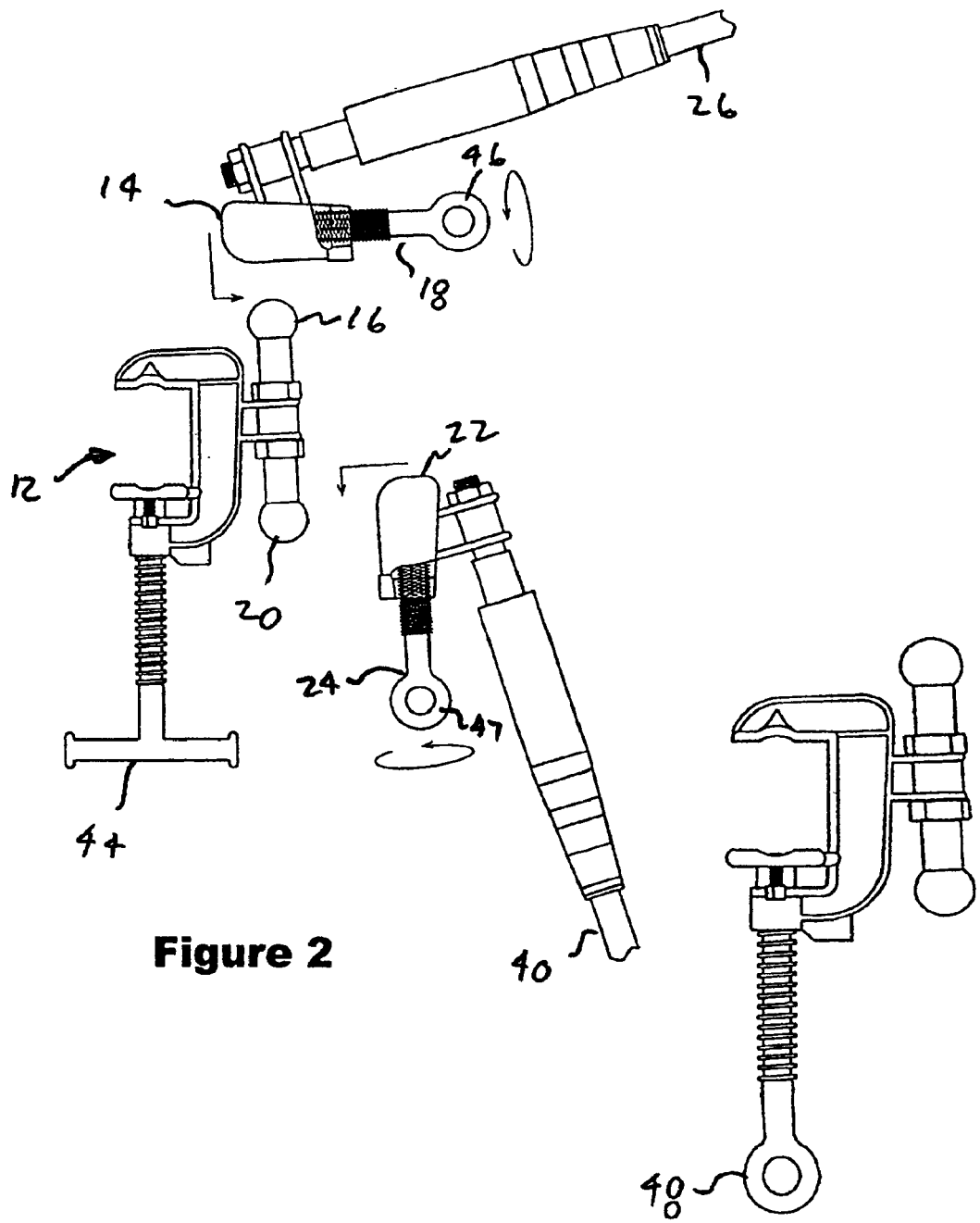
FIG. 2 is an elevation exploded view of the embodiment of the invention of FIG. 1.
FIG. 2a is an elevation view of an alternate handle of the cable clamp shown in FIG. 2.

FIG. 2 is an exploded elevation view of the clamp of FIG. 1. The locking articulated cable contact connectors 14 and 22 are shown removed from their respective ball mount assemblies 16 and 20 to provide a better understanding of the interoperation and coupling of locking articulated cable contact connectors 14 and 22 with their respective ball mount assemblies 16 and 20. Preferably, the connector mount locks 18 and 24 are provided with a corresponding eye 46 and 47 to facilitate rotation of the connector mount lock with a linesman's hot stick tool. A hot stick tool has an insulated rod with a hook disposed at one end adapted to engage the eye or hot stick circle 46. A linesman manipulates the hot stick to engage or disengage the eye. When the eye is engaged, the hot stick is rotated to effect rotation of the connector mount lock 18 (or 24) and effect locking or release of the locking articulated cable contact connector 14 (or 22).

FIG. 2a shows a variation of the handle of the cable clamp 12 shown in FIGS. 1 and 2. In the variation of FIG. 2a, the cable clamp handle has an eye or hot stick circle 48 in place of the actuator T-handle 44 depicted in FIGS. 1 and 2.

Figures 3A, 3B:
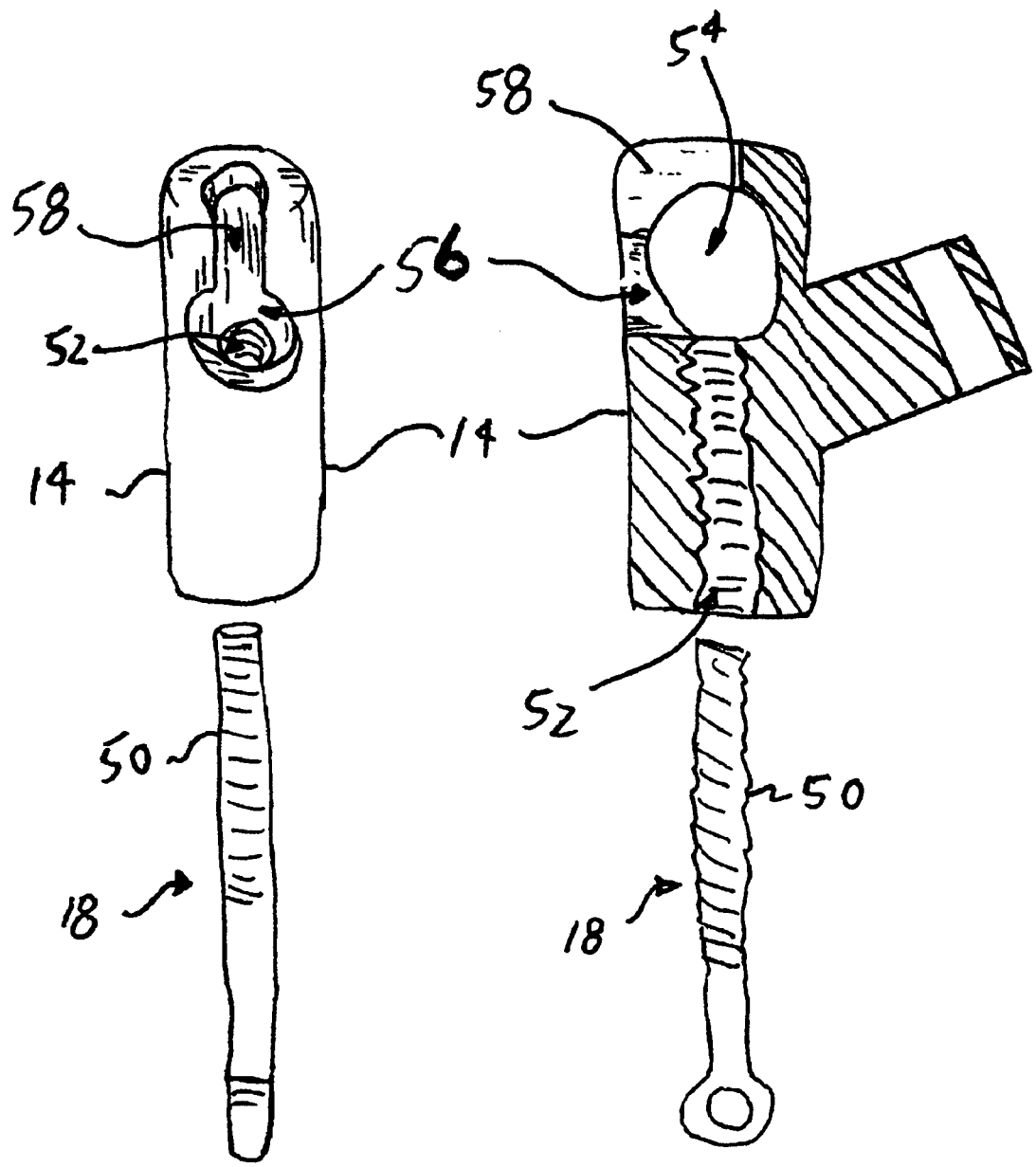

FIG. 3a shows an elevation view of the inventive locking articulated cable contact connector 14 (or 22) and corresponding connector mount lock 18 (or 24). FIG. 3b is a cross section of the apparatus of FIG. 3a and is provided for further exemplification in the discussion that follows. The connector mount lock 18 (or 24) has a threaded end 50 which is threadingly received into a threaded bore 52 that extends through the body of the locking articulated cable contact connector 14 (or 22). An end of the locking articulated cable contact connector 14 (or 22) forms a mating socket 54 which is a spherical cavity dimensioned to receive the ball end of ball mount assembly 16 (or 20). The spherical surface of socket cavity 54 surrounds the ball of the ball assembly over which it is mounted. A circular opening 56 is provided at a mid-portion of the locking articulated cable contact connector 14 (or 22) to facilitate mounting and dismounting the locking articulated cable contact connector 14 (or 22) on a corresponding ball assembly. A slot 58 extends along a side and toward and around to an end of the locking articulated cable contact connector 14 (or 22). The slot 58 is dimensioned to slidingly engage the stud portion of the ball stud assembly that it is fitted to but is too small to permit passage therethrough of the ball of the ball stud assembly. Only circular opening 56 is of a dimension sufficiently large enough to permit the ball of a ball stud assembly to pass therethrough. In this manner, the stud portion 60 to which the ball 62 of the ball mount assembly 16 is mounted is able to be rotated with respect to the locking articulated cable contact connector 14 when the connector mount lock 18 is loosened. When the connector mount lock 18 is loosened, the locking articulated cable contact connector is released for rotation and movement with respect to the ball mount assembly 16.

While the foregoing discussion relating to FIGS. 3a and 3b was made principally with reference to cable connector apparatus 14, 16 and 18, it will be understood the foregoing discussion applies equally to the cable connector apparatus 20, 22 and 24.

Figure 4A:
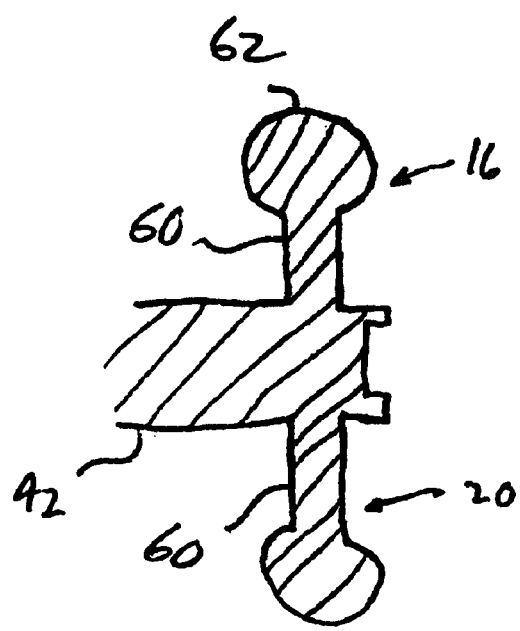
FIGS. 4a, 4b and 4c are cross-sectional views of alternative embodiments of the interconnection member of the present invention constructed according to different manners of manufacture.
Figure 4B:
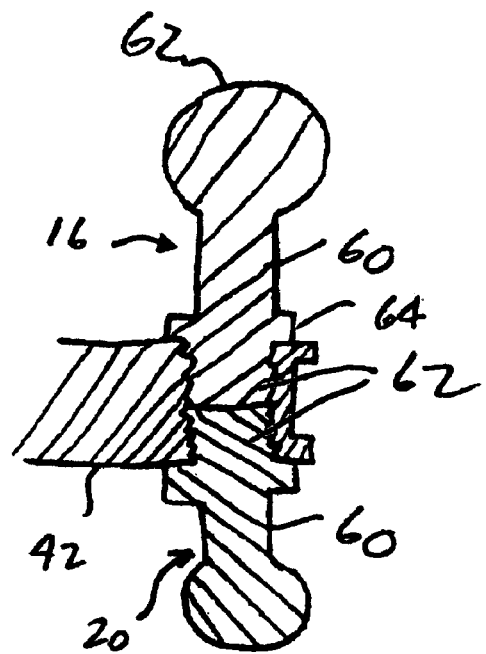
Figure 4C:
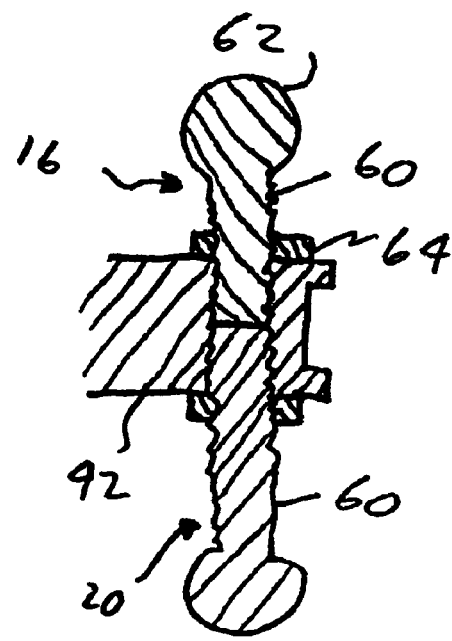

FIGS. 4a, 4b and 4c show alternate embodiments of manufacture of the interconnection member and associated ball mount assemblies 16 and 20 and are provided to illustrate various manners of construction of the interconnection member including the structures for interconnection of the ball mount assemblies to the clamp lug 42. In the construction depicted in FIG. 4a, the interconnection member has two ball mount assemblies 16 and 20 that are formed as a one-piece structure integral with clamp lug 42. Naturally, it is understood that the invention is not restricted to two ball mount assemblies, which is the preferred arrangement for the interconnection member. The interconnection member may be provided with other numbers of ball mount assemblies, for example one ball mount assembly or three ball mount assemblies. In this one piece manner of construction of the interconnection member, the ball mount assemblies 16 and 20 are forged or machined out of the same metal as the clamp and clamp lug 42 from which they are disposed.

In the alternative interconnection member construction depicted in FIG. 4b, a threaded end portion 62 is provided respectively on the ball mount assemblies 16 and 20. The threaded end portion permits threading engagement of the ball mount assemblies of the interconnection member and the clamp lug 42. Preferably, a shoulder nut 64 is provided to enable a wrench to be applied to the ball assembly of the interconnection member and lockingly secure the respective ball assembly to the clamp lug 42.

FIG. 4c shows a third embodiment of the interconnection member, which has a lug constructed where a nut 64 is threadingly engaged to the threaded end portion 62 of the stud 60 of the ball assembly. In this manner of construction of the interconnection member, a shoulder nut 64 is threaded onto the ball assembly which is then fitted or threaded into a corresponding threaded bore of a clamp lug 42 of the interconnection member. Once the ball stud has been threaded into the clamp lug to the desired position, the shoulder nut 64 is tightened to lock each of the pieces of the interconnection member with respect to the other.

Figure 5:
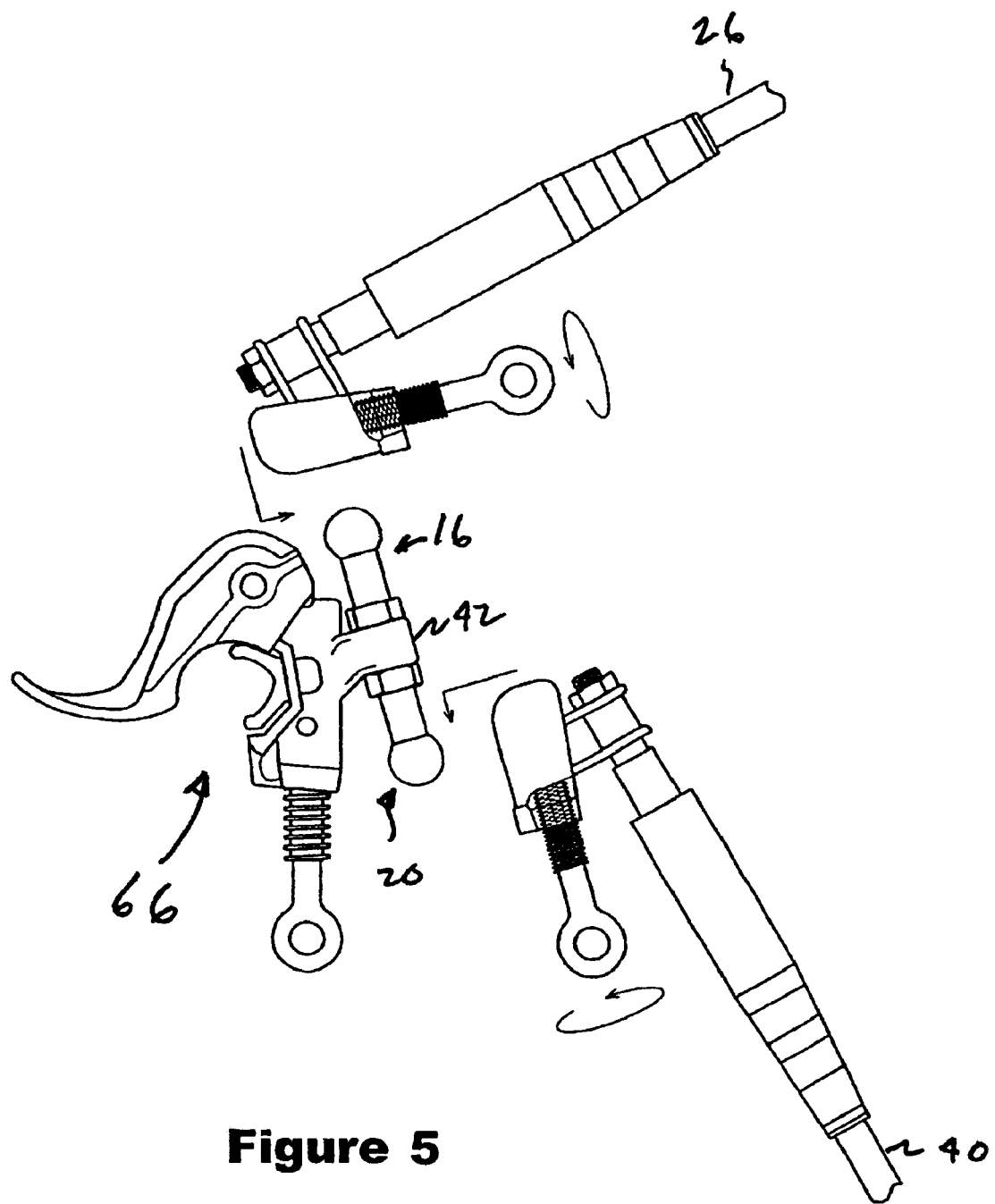
FIG. 5 is an exploded elevation view of a preferred embodiment of the invention disposed on a duck bill clamp type cable clamp.

FIG. 5 shows a duck bill clamp type of cable clamp 66 that is fitted with the electrical conductor interconnection apparatus of the present invention. As shown in the figure, clamp 66 has ball mount assemblies 16 and 20 disposed from clamp lug 42. The conductors 26 and 40 are mounted on the corresponding respective ball mount assemblies 16 and 20 to facilitate interconnection of conductors 26 and 40 to the duck bill clamp cable clamp 66.

As will be understood from the foregoing, the interconnection apparatus of the present invention may be arranged and can be deployed with multiple types of cable clamps of which, for example, FIG. 5 shows a duck bill clamp type cable clamp.

Figure 6:
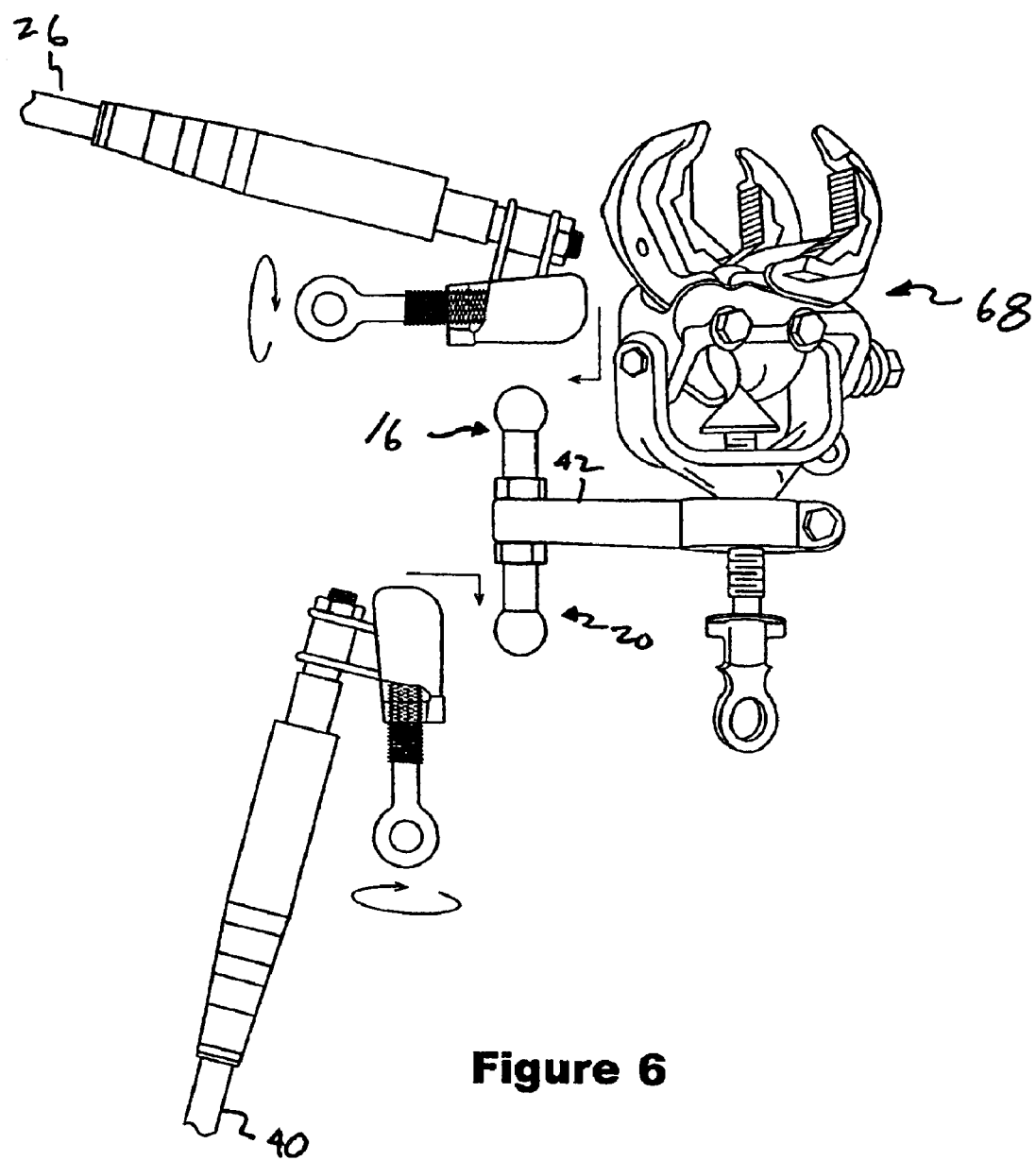
FIG. 6 shows an elevation exploded view of a preferred embodiment of the clamp arrangement of the present invention configured with a jaw clamp type cable clamp.

FIG. 6 shows a jaw type cable clamp 68 that is fitted with the interconnection apparatus of the present invention. In the embodiment of FIG. 6, ball mount assemblies 16 and 20 are disposed on clamp lug 42. Conductors 26 and 40 are mounted to the jaw type cable clamp 68 in the same manner as was described with reference to FIGS. 1 and 2.

Now that the invention has been described, numerous modifications and substitutions will occur to those skilled in the art. The scope of the invention is not limited to the specific embodiments described herein but is defined by the claims appended hereto.

What is claimed is:

1. An apparatus for interconnection of electrical conductor cables comprising:
   (a) an interconnection member adapted to be disposed on a cable clamp;
   (b) at least one lockable articulated cable contact connector coupled to said interconnection member;
   (c) means to fit said lockable articulated cable contact connector to an end of an electrical conductor; and
   (d) releasable connector mount lock means configurable between a locked configuration wherein said interconnection member and said lockable articulated cable contact connector are maintained in locked position relative to each other and an unlocked configuration permitting relative rotation in three dimensions between said lockable articulated cable contact connector and said interconnection member.

2. The apparatus of claim 1 wherein said lockable articulated cable contact connector is coupled to said interconnection member with a ball fixedly mounted on an end of a smaller dimensioned stud member and a mating socket coupling.

3. The apparatus of claim 2 wherein said lockable articulated cable contact connector forms said mating socket and said interconnection member supports said ball stud member.

4. The apparatus of claim 3 wherein said socket formed by said lockable articulated cable contact connector comprises:
   (a) a circular opening formed in said lockable articulated cable contact connector dimensioned to receive the ball of said ball stud member; and
   (b) a slot formed in said lockable articulated cable contact connector extending along a side and toward and along an end of said lockable articulated cable contact connector, the slot dimensioned to slidingly receive the stud of said ball stud member and too small to permit passage of the ball of said ball stud member therethrough.

5. The apparatus of claim 2 wherein said releasable connector mount lock means comprises a threaded rod and a mating threaded bore formed in said lockable articulated cable contact connector extending from an end of said lockable articulated cable contact connector to said socket.

6. The apparatus of claim 2 wherein said ball fixedly mounted on an end of a smaller dimensioned stud member is integrally formed with said interconnection member.

7. The apparatus of claim 2 wherein said stud member threadingly receivable in said interconnection member.

8. The apparatus of claim 6 further including nut means provided on said stud member.

9. The apparatus of claim 8 wherein said nut means is integrally formed on said stud member.

10. The apparatus of claim 8 wherein said nut means is threadingly engagable to said stud member.

11. The apparatus of claim 7 further including nut means provided on said stud member.

12. The apparatus of claim 11 wherein said nut means is integrally formed an said stud member.

13. The apparatus of claim 11 wherein said nut means is threadingly engagable to said stud member.

* * * * *